United States Patent [19]

Zener

[11] 4,431,016

[45] Feb. 14, 1984

[54] METHOD AND APPARATUS FOR FOAM LUBRICATION

[76] Inventor: Clarence Zener, 3955 Bigelow Blvd., Pittsburgh, Pa. 15213

[21] Appl. No.: 306,867

[22] Filed: Sep. 29, 1981

[51] Int. Cl.³ .......................... F17D 1/00; F03G 7/04
[52] U.S. Cl. .......................... 137/1; 137/13; 60/641.7
[58] Field of Search ...... 60/649, 673, 641.7; 137/13, 1; 261/DIG. 26; 435/812

[56] References Cited

U.S. PATENT DOCUMENTS

| 2,821,205 | 1/1958 | Chilton et al. | 137/13 |
| 3,175,571 | 3/1965 | Bankert | 137/13 X |
| 3,805,515 | 4/1974 | Zener | 60/641.7 |
| 3,995,160 | 11/1976 | Zener et al. | 60/641.7 X |
| 4,027,993 | 6/1977 | Wolff | 60/649 X |
| 4,308,722 | 1/1982 | Molini et al. | 60/649 X |

Primary Examiner—Allen M. Ostrager
Assistant Examiner—Stephen F. Husar
Attorney, Agent, or Firm—Buell, Blenko, Ziesenheim & Beck

[57] ABSTRACT

The specification discloses a method and apparatus for preventing breakdown of a column of foam moving in a vessel wherein a fluid is applied to the interior surface of the vessel walls.

5 Claims, 7 Drawing Figures

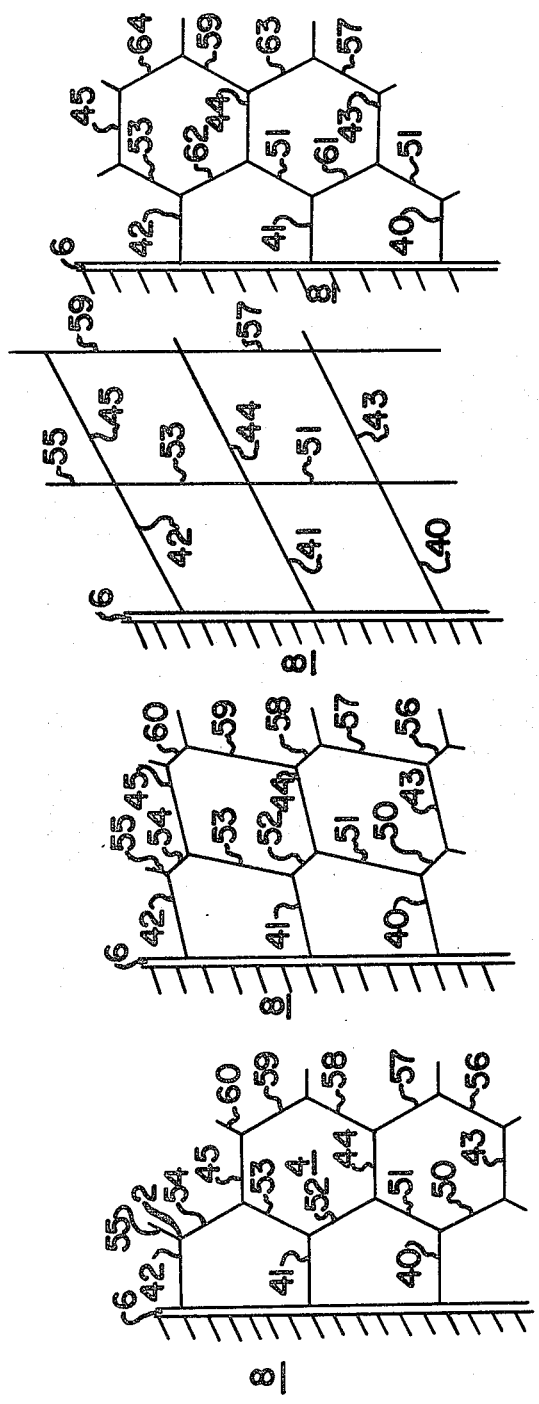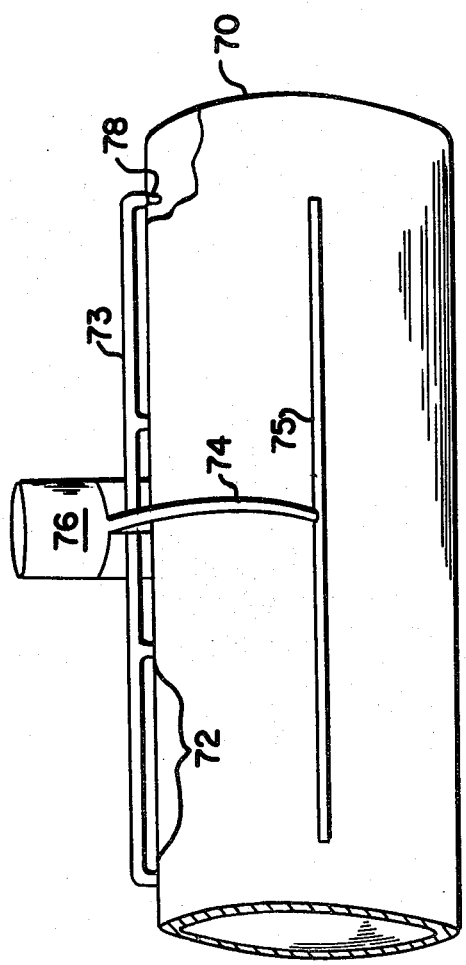

METHOD AND APPARATUS FOR FOAM LUBRICATION

BACKGROUND OF THE INVENTION

Foam is a mixture of a gas and a liquid in which the gas is dispersed in the liquid. Until recently foam, particularly water-vapor foams, had no useful purpose and indeed were considered undesirable in many situations. During the past few years, however, we have learned that foam can be a very useful material for the production of energy. In U.S. Pat. No. 3,995,160 to Zener et al., Fetkovich and I disclose an apparatus for obtaining electrical power from sea water in which foam generated in a closed vessel rises to the top of the vessel and there is generated into its liquid and vapor phases. Then the liquid phase falling under force of gravity drives a turbine. This system is potentially capable of extracting up to six times as much net work from a given warm water input as can be extracted by the closed ocean thermal energy conversion (OTEC) systems currently available.

The foam type OTEC systems require a steadily rising column of foam for efficient operation. Foam is fragile in nature and may break down when it moves in a closed vessel unless the foam contains a high surfactant concentration. When the foam in an OTEC system breaks the column falls and must be regenerated.

The prior art has provided no explanation as to why this breakdown occurs or how to prevent it. I have discovered that this foam breakdown occurs through the inability of the wall-foam interface to protect the wall interior from the wall effects, both mechanical and thermal. To overcome this breakdown I have developed a method and apparatus for maintaining the required surfactant concentration in the wall-foam interface irrespective of the surfactant concentration of the foam interior. I do this by adding a fluid, which I call a lubricant, to the interior wall of the vessel containing the foam.

SUMMARY OF THE INVENTION

I prefer to provide a lubricant comprised of a mixture of water and surfactant at the vessel-foam interface.

I further prefer to inject the lubricant at the top of the vessel and permit it to fall by gravity along the inner surface of the vessel.

In a first preferred embodiment of the invention I provide a means for injecting the lubricant at the top of the vessel, a means for collecting the lubricant at the base of the vessel and a means for recycling the lubricant.

In a second preferred embodiment of the invention I prefer to provide a plurality of ports in the vessel walls for injecting lubricant.

Other details, objects and advantages of the invention will become apparent as a description of certain preferred embodiments of the inventions proceeds.

In the accompanying drawings, I have shown certain present preferred embodiments in which:

FIGS. 1 thru 4 are sequential diagrams of the interface between a vessel wall and rising foam;

FIG. 7 is a horizontal conduit employing a third preferred embodiment of the invention.

Figure 5:
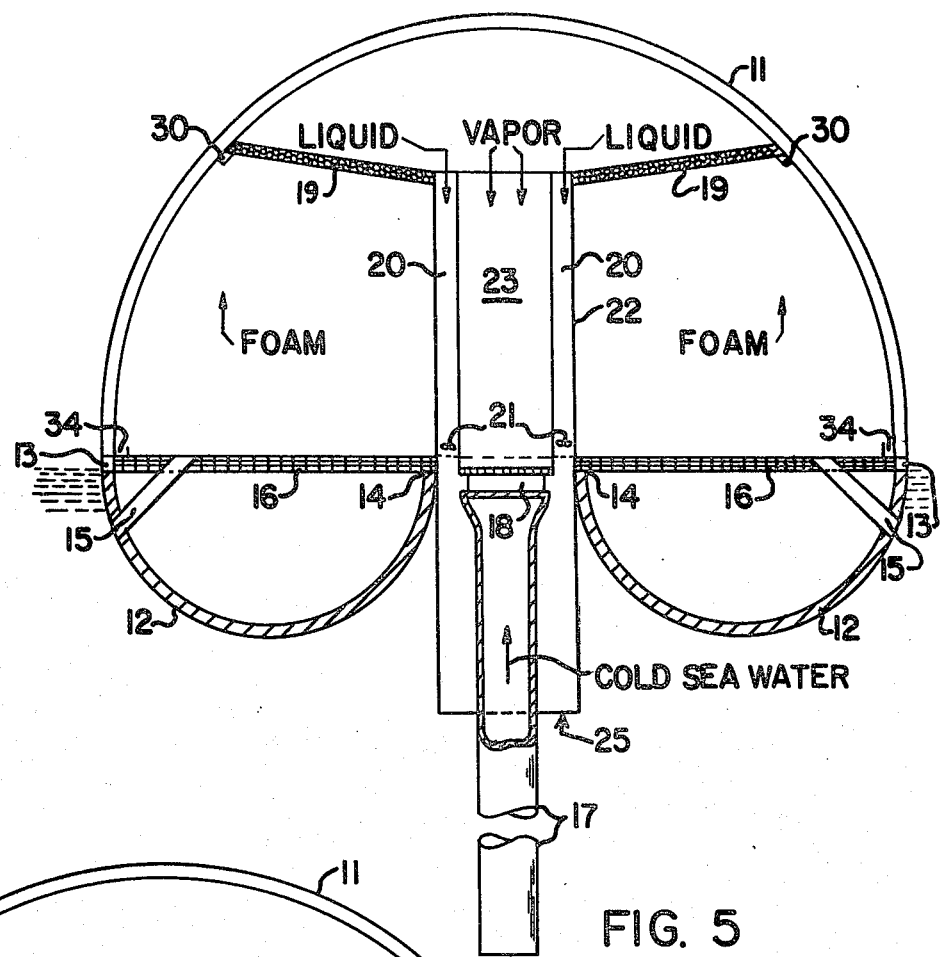
FIG. 5 is a schematic view of an electrical power generating plant employing a first preferred embodiment of the invention.

Referring to FIGS. 1 thru 4 a foam is comprised of a multitude of cells having liquid walls 2 and a vapor center 4. When foam is produced in a vessel a film 6 will form on the side of the vessel 8 and a series of initially horizontal cell walls 40, 41, and 42 will extend from that film. Inclined cell walls 50 thru 55 extend from horizontal walls 40, 41 and 42 to define the row of foam cells adjacent to the vessel wall. A second column of foam cells is defined by inclined walls 50 thru 60 and horizontal walls 43 thru 45. As the foam rises the second row of cells slides over the first row of cells by a process of expansion and contraction of walls. This process is illustrated in FIGS. 1 thru 4. Inclined walls 50, 52, 54, 56, 58 and 60 contract and then disappear (FIG. 3) as walls 51, 53, 55, 57 and 59 expand. Horizontal walls 40 thru 42 pivot about cell wall 6 while horizontal walls 43 thru 45 tilt and rise. As wall 43 passes wall 40 new walls 61 thru 64 are formed. As the foam rises fluid is continually being drained from the cell walls into the corners. Walls 40, 41 and 42 are normally so thin that they have a slow upward drift. Because of the slow rise of these walls and the tendency of the fluid to flow to the corners, walls 40, 41 and 42 break, thereby rupturing the interface between the foam and the vessel. The breaking of one wall throws an additional stress on the neighboring walls which leads to a sudden rupture of the entire foam column. Wall 6 must be thick enough to supply fluid to walls 40, 41 and 42 so that they will not rupture.

We desire that thickness W of wall 6 which minimizes the shear stress at the foam surface. The velocity V(y) of the rising foam must satisfy the differential equation $$(d^2V/dy^2) = \rho g$$

where y is the distance from the vessel wall, $\rho$ is water density and g is gravity and also the two boundary conditions $$V(O) = O, \quad V(W) = V_s$$

where $V_s$ is the velocity of the film at its outer surface. This solution is $$V = \frac{\rho g}{2\mu} y^2 + \left( \frac{V_s}{W} - \frac{\rho g W}{2\mu} \right) y$$

where $\mu$ is the viscosity of water.
The shear stress is $$\eta(y) = \frac{\mu dV}{dy}$$

We now choose W to have that value W* which minimizes $\eta(W)$. We have $$\eta(W) = \frac{\rho g W}{2} + \frac{\mu V_s}{W}$$

and hence the minimizing W is given by $$W^* = \sqrt{\frac{2\mu V_s}{\rho g}}$$

$$= 0.0045 \sqrt{V_s}$$

This optimum thickness for wall 12 is thus 0.045 cm for a typical value of 100 cm/sec for $V_s$. This is 45 times thicker than the typical wall thickness of 0.001 cm.

To achieve a thicker wall at the interface between the foam and the wall and thereby prevent the foam from breaking, I inject a fluid or lubricant onto the wall surface. For water based foams I prefer to use a water and surfactant mixture as the lubricant. If a surfactant is used in the foam, that same surfactant could be used in the lubricant or a different surfactant may be used. I further prefer to use a biodegradable surfactant such as Shell Chemical Company's Neodol 25-3A. A lubricant containing as little as 10 parts per million of surfactant will work in a foam type OTEC system. To use more than 100 parts per million of surfactant would be uneconomical in an OTEC foam type system when you compare the cost of the surfactant to the amount of energy produced. Thus, I consider 100 ppm to be the practical limit on the amount of surfactant to use even though higher levels of surfactant could be used if cost were not a factor. The lubricant preferably contains a higher concentration of surfactant than the bulk of the foam. This will strengthen the critical walls (40, 41 and 42 of FIG. 1).

Figure 6:
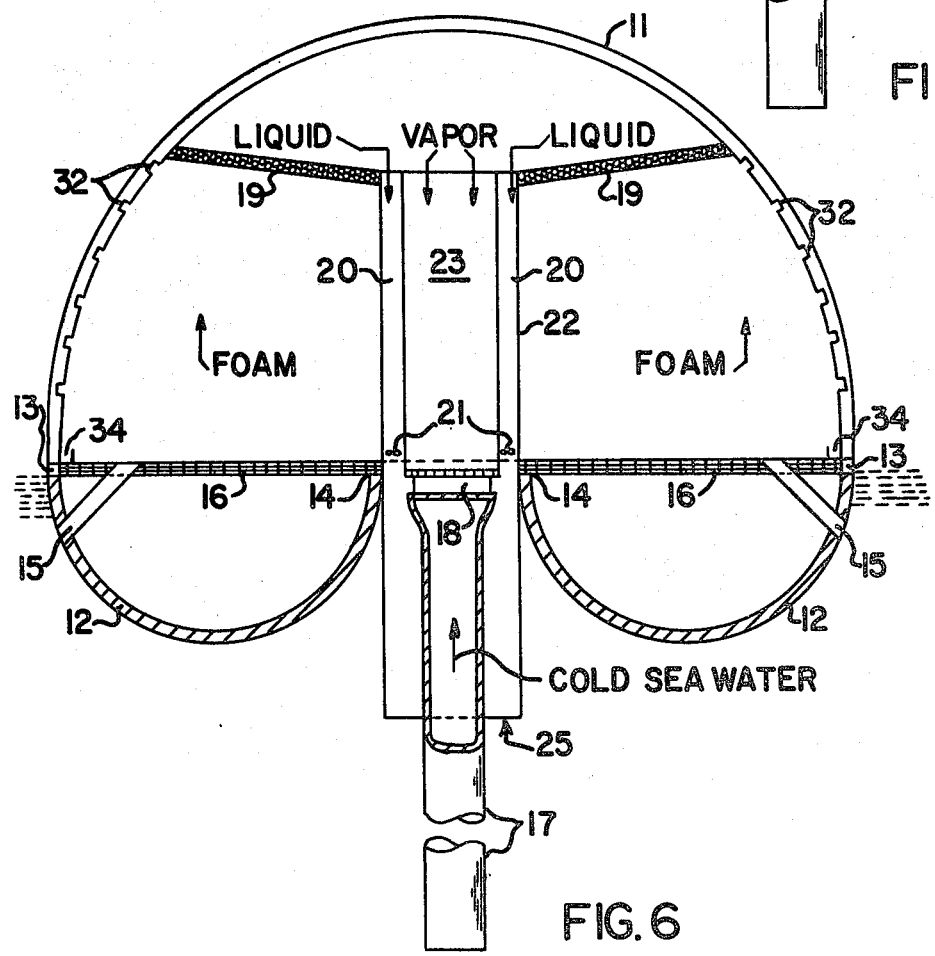
FIG. 6 is a schematic view of an electrical power generating plant employing a second preferred embodiment of the invention.

In FIGS. 5 and 6 I have shown a foam type electrical generating plant of the type disclosed in my U.S. Pat. No. 3,995,160 to which I have added certain present preferred embodiments of my invention. The plant is comprised of a dome 11 constructed of reinforced concrete. The dome 11 is supported by buoyant 12 made of steel or some other rigid material and containing vapor to provide buoyancy. The dome 11 and buoyant 12 engage at edge 13 of structure 12 so as to seal the interior of the dome from atmospheric pressure. Edge 14 of structure 12 supports the various conduits and operational equipment of the plant. A top inlet 30 (FIG. 5) or a plurality of inlets 32 (FIG. 6) are provided for injecting lubricant onto the inner surface of the dome. The lubricant will fall down the inner surface of the dome and into a collector 34 from which it can be recycled to the inlets by piping (not shown) in the dome wall or about its exterior.

Intake ports 15 carry warm surface water into the dome and onto a foam generating means 16. The foam generating means consists of a source of water vapor provided to the wave surface water through a plurality of minute orifices. Cold deep water is carried into the dome through pipe 17 to the level of condenser 18. Pipe 17 extends through the center of structure 12 from a point below the surface of the ocean. Foam separator 19 is supported by structure 22 at approximately 550 feet above the foam generator 16. The foam breaker can be a turbine fan which centrifically separates the vapor and liquid phases of the foam. The liquid is then carried through conduits 20 to drive turbines 21. Conduits 20 are enclosed by shield 22 to preserve the stream-line upward flow of the foam. The separated vapor phase is carried by conduit 23 to condenser 18 where it is condensed by means of the cold deep water. The exhaust liquid from the turbine of the recondensed vapor are then exhausted through ports 25 to the ocean.

In operation the warmer surface water would be conducted into the closed environment of the dome through intakes 15 onto foam generating means 16 and colder deep water would be conducted to the condenser through pipe 17. The presence of the warmer and colder water at saturated vapor pressure in the closed environment isolated from atmospheric pressure results in evaporation of the warmer water. Water vapor is introduced into the warmer water through a plurality of small orifices by the foam generating means 16. The pressure gradients within the dome cause the foam to rise. Meanwhile, lubricant is injected through outlets 30 or 32. As the foam rises it increases in velocity which means that lubrication demands at the foam-wall interface increase as you go up the dome wall. Therefore, wall 6 (FIG. 1) must be thicker at the top of the dome than at the bottom. With the top injection system of FIG. 5 this variation in wall thickness occurs because of the tendency of the falling lubricant to become narrower in width as it falls. When the rising foam reaches the foam separator 19, it is divided into its liquid and vapor phases. The liquid phase is used to propel turbines 21 and then is exhausted into the ocean. The vapor phase is condensed by condenser 18 and also exhausted to the ocean.

My invention could also be used in horizontal or inclined conduits used for foam transportation as shown in FIG. 7. A conduit 70 is fitted with a plurality of inlets 72 interconnected by pipes 73, 74 and 75 which in turn are mounted to a lubricant supply source 76 that may be mounted on the conduit 70. Nozzles 78 may be provided at the inlets to direct the lubricant to swirl along the interior wall of the conduit. One could minimize the tendency of the lubricant to collect at the bottom of the conduit by pumping the foam into the conduit so that it will swirl through the conduit rather then move only horizontally. If such pumping action were used nozzles 78 could be eliminated and one could inject the lubricant through a single set of inlets located on the top of the conduit.

The above discussion of foam lubrication referred specifically to the prevention of column-foam breakdown through purely mechanical strengthening. Foam lubrication may also retard column-foam breakdown by impeding thermal flow between the wall and the foam. It is clear that such lubrication can have beneficial side effects, such as the reduction of friction loss. My invention of enhancing the performance of a foam system by artificial lubrication is applicable to however the performance is measured.

While I have shown and described certain present preferred embodiments of the invention and have illustrated certain present preferred methods of practicing the same, it is to be distinctly understood that the invention is not limited thereto, but may be otherwise variously practiced within the scope of the following claims.

I claim:

1. A method for preventing the breakdown of foam moving through a conduit having inner and outer surfaces comprising the steps of:

(a) applying a fluid to the inner surface of the conduit, and (b) causing the foam to move through the conduit.

2. The method of claim 1 wherein the conduit is a closed vessel.

3. The method of claim 1 wherein the fluid is a mixture of water and surfactant.

4. The method of claim 1 also comprising the steps of:
 (a) collecting the fluid, and
 (b) recirculating the fluid for reapplication to the inner surface of the conduit.

5. The method of claim 1 wherein the foam is moved by pumping the foam into the conduit.

* * * * *

UNITED STATES PATENT AND TRADEMARK OFFICE
CERTIFICATE OF CORRECTION

PATENT NO. : 4,431,016
DATED : February 14, 1984
INVENTOR(S) : Clarence Zener

It is certified that error appears in the above-identified patent and that said Letters Patent is hereby corrected as shown below:

Column 1, line 17, "generated" should be --separated--.

Column 3, line 55, "wave" should be --warm--.

Signed and Sealed this

Twenty-second Day of May 1984

[SEAL]

Attest:

GERALD J. MOSSINGHOFF

Attesting Officer

Commissioner of Patents and Trademarks